(12) United States Patent
Zurcher

(10) Patent No.: US 9,521,810 B2
(45) Date of Patent: Dec. 20, 2016

(54) HANDHELD POWER TOOL

(71) Applicant: FELCO MOTION SA, Les Geneveys-sur-Coffrane (CH)

(72) Inventor: Alain Zurcher, Pampigny (CH)

(73) Assignee: Felco Motion SA (CH)

( * ) Notice: Subject to any disclaimer, the term of this patent is extended or adjusted under 35 U.S.C. 154(b) by 154 days.

(21) Appl. No.: 14/396,695

(22) PCT Filed: Apr. 29, 2013

(86) PCT No.: PCT/EP2013/058906
§ 371 (c)(1),
(2) Date: Oct. 23, 2014

(87) PCT Pub. No.: WO2013/164310
PCT Pub. Date: Nov. 7, 2013

(65) Prior Publication Data
US 2015/0113810 A1      Apr. 30, 2015

(30) Foreign Application Priority Data

May 4, 2012   (CH) .......................................... 615/12

(51) Int. Cl.
*B26B 15/00*    (2006.01)
*A01G 3/037*    (2006.01)
(Continued)

(52) U.S. Cl.
CPC ........... *A01G 3/037* (2013.01); *F16C 11/0604* (2013.01); *F16H 25/2021* (2013.01); *Y10T 74/1868* (2015.01)

(58) Field of Classification Search
CPC .. A01G 3/037; F16C 11/0604; F16H 25/2021; B26D 5/08; B26B 15/00; F16D 3/2052; Y10T 74/1868
See application file for complete search history.

(56) References Cited

U.S. PATENT DOCUMENTS 1,553,312 A * 9/1925 Garrecht ............... F16D 3/2052
                                                            464/115
3,178,816 A * 4/1965 Schmid .................. A01G 3/037
                                                             30/180
(Continued)

FOREIGN PATENT DOCUMENTS

DE      8814543 U1    1/1989
EP      0291431 A1   11/1988
(Continued)

*Primary Examiner* — Hwei C Payer
(74) *Attorney, Agent, or Firm* — Blank Rome LLP

(57) ABSTRACT

The invention related to a handheld power tool having a linear actuator and a removable member, e.g. a blade, wherein the movable member is directly connected to the actuator via a connecting rod, which pushes the movable member during a work stroke and pulls the movable member to a starting position during a return stroke. One end of the connected rod is connected, via a concentric dual ball-and-socket joint, to the actuator as well as to a guide ring that slides inside the cylindrical body of the tool. Lateral and bending forces are taken up and transmitted to the body of the tool by the guide ring without affecting the actuator. The ring defines a sealed space that houses the actuator. An axial cavity of the connecting rod partially houses the actuator in the retracted position, thus reducing the length of the tool.

9 Claims, 3 Drawing Sheets

(51) Int. Cl.
*F16H 25/20* (2006.01)
*F16C 11/06* (2006.01)

(56) References Cited

U.S. PATENT DOCUMENTS

| | | | | |
|---|---|---|---|---|
| 3,609,994 | A * | 10/1971 | Colletti | F16D 3/2052 464/122 |
| 4,395,246 | A * | 7/1983 | Taig | F16D 3/265 464/110 |
| 5,002,135 | A | 3/1991 | Pellenc | |
| 5,816,926 | A * | 10/1998 | Lynch | F16D 3/32 464/114 |
| 5,867,909 | A * | 2/1999 | Jeltsch | B26B 15/00 30/216 |
| 8,122,607 | B2 * | 2/2012 | Maniwa | A01G 3/037 30/228 |
| 8,656,597 | B2 * | 2/2014 | Pellenc | A01G 3/037 30/194 |
| 9,168,667 | B2 * | 10/2015 | Zurcher | A01G 3/037 |
| 9,175,720 | B2 * | 11/2015 | Adamczyk | F16C 11/0604 |
| 2010/0192383 | A1 | 8/2010 | Ishiguro | |
| 2011/0229254 | A1 * | 9/2011 | Su | F16D 3/2052 403/114 |
| 2012/0143195 | A1 * | 6/2012 | Sander | A61B 17/162 606/80 |
| 2015/0113810 | A1 * | 4/2015 | Zurcher | A01G 3/037 30/228 |

FOREIGN PATENT DOCUMENTS

| | | |
|---|---|---|
| EP | 2213426 A1 | 8/2010 |
| FR | 1503674 A | 12/1967 |
| WO | WO 2013/164310 A1 * | 11/2013 |

* cited by examiner

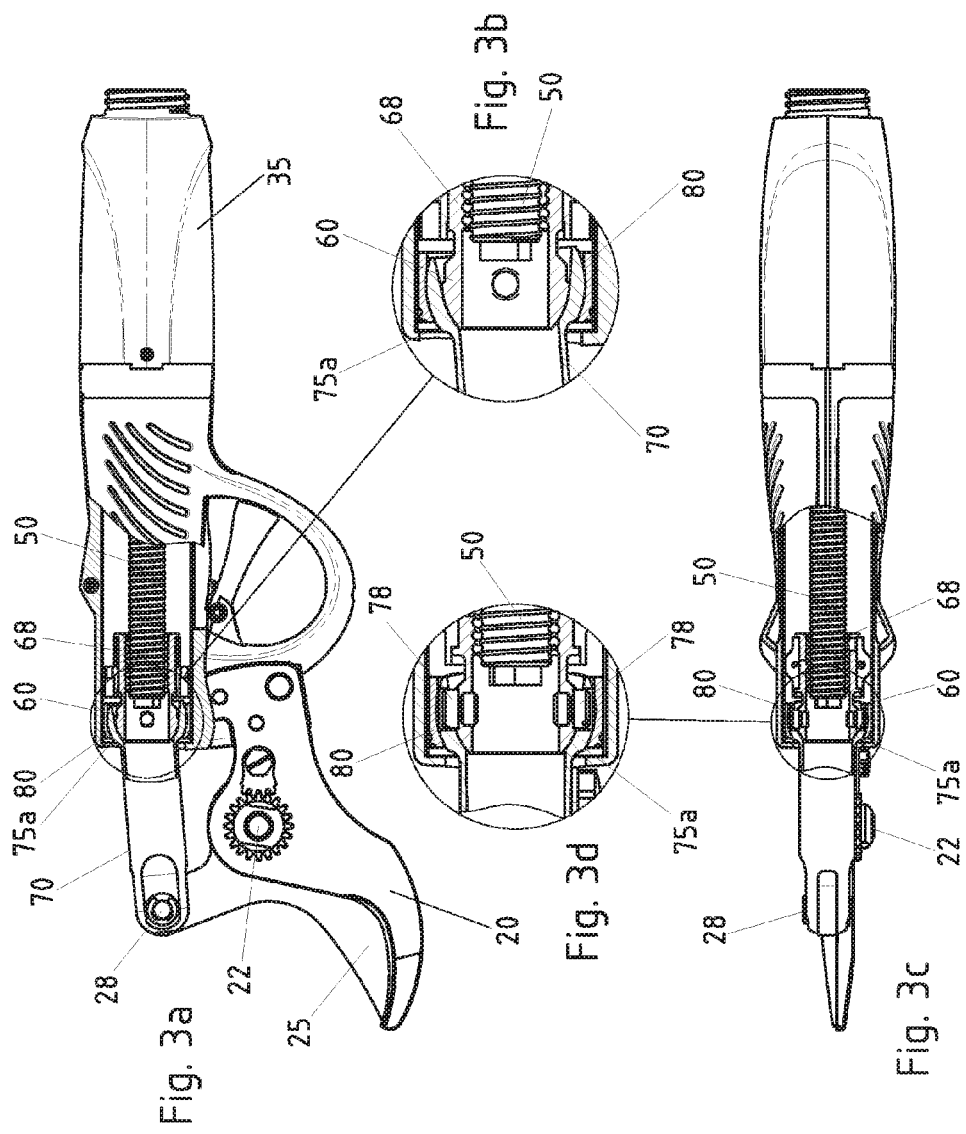

HANDHELD POWER TOOL

REFERENCE DATA

The present application is a national stage of PCT/EP2013/058906, filed Apr. 29, 2013, which claims priority of the Swiss patent application CH0615/12 of May 4, 2012. The content of those applications are hereby incorporated by reference.

TECHNICAL FIELD

The present invention relates to a handheld power tool and particularly, but not exclusively, a handheld power tool with an electric actuator fed by batteries for actuating a blade, a knife or another movable element.

PRIOR ART

A number of examples of portable tools of the pruning shear or shear type equipped with an electric, hydraulic or pneumatic actuator thus making it possible to reduce the effort of operators are known in the art. These tools are used particularly in the field of agriculture or viticulture, for example for cutting operations. The same principle, that is to say the integration of an electric, pneumatic or hydraulic actuator in a portable tool, is also used in shears, crimping pliers, presses, and many other tools used in a number of industrial activities.

The availability of electrochemical accumulators that are light and efficient has recently favored the development of electrically actuated tools, which are lighter and quicker than corresponding tools actuated pneumatically or hydraulically. The linear electric actuators contained in these tools are more delicate, however, than pneumatic jacks and have to be protected from the infiltration of dusts, foreign bodies and liquids. This is the case in particular in the field of agriculture, when the cutting operations are combined with spraying treatments.

The development of batteries and actuators that are more efficient and compact has additionally allowed the production of tools that are increasingly powerful, which are used to generate very substantial mechanical forces. These forces, particularly when they are lateral forces, can reduce the reliability and longevity of the actuator.

In the majority of handheld electric pruning shears, the linear actuator functions via traction during the work stroke of the tool and acts directly on the movable blade, or by means of an auxiliary lever system. Taking into account the need to limit the dimensions of the tool, the transmission of the force in the known tools is rarely optimal.

EP0291431 describes a pruning shear comprising an electric motor coupled to a gear reducer. The output of the gear reducer is coupled to a ball screw/ball nut system comprising a ball screw that is rotatable and fixed against translation and a ball nut that is movable in translation and fixed against rotation. The axially movable nut is connected by means of a pair of connecting rods to the movable blade. In this pruning shear, the work force is transmitted by pulling the movable blade.

DE8814543, FR1503674 and EP2213426 describe handheld electric pruning shears comprising a screw/nut system in which the work force is transmitted by pushing the movable blade of the pruning shear with the aid of one or more connecting rods, which connect the movable blade of the shears to the screw/nut system.

In these shears the lateral and bending forces, which can be considerable in the case of a handheld electric pruning shear, act on the actuator, that is to say on the screw/nut system, which reduces the efficacy of transmission and the reliability of the pruning shear.

BRIEF SUMMARY OF THE INVENTION

There is thus a need to propose a system for transmitting the force of the actuator to the blade or to the movable element of the tool, which combines excellent mechanical efficacy and a strict guidance, thus limiting the forces acting on the actuator itself.

There is also the need to propose solutions for protecting the actuators from foreign bodies and dust whilst maintaining the efficacy and compactness of the actuators.

An object of the present invention is to propose a handheld power tool having these features and free from the limitations of the known devices.

In accordance with one aspect of the invention, these objects are achieved in particular by means of a handheld electric tool comprising an actuator acting by means of a connecting rod on a movable element, which can perform, under the action of the actuator, movements in two directions, in which the actuator is used to provide a work force when the movable element moves in a first direction corresponding to the work stroke of the tool and a return force substantially smaller than the work force when the movable element moves in the direction opposite the first direction, corresponding to a return stroke of the tool, and in which the work force is transmitted by pushing the movable element. In accordance with this aspect of the invention, the major force is provided by an action of compression of the transmission connecting rod, whereas in the known tools the major force is transmitted when the connecting rod operates via traction. This feature allows a more direct connection between the actuator and the blade or the movable element and improves the compactness of the assembly.

The actuator of the handheld power tool according to the invention is advantageously connected to the connecting rod via a first linkage of the ball joint type and to a guide element via a second linkage of the ball joint type, which is concentric with said first linkage. This feature enables a precise guidance of the connecting rod, and the transmission of lateral forces to the body of the tool, whereas the actuator is subjected to purely axial forces.

In a variant, a movable end of the actuator is connected to a guide ring that slides inside the body of the tool, such that the body of the tool and the guide ring delimit a protected volume within which the actuator is arranged. In this way, the actuator is protected against the harmful effects of dusts, rain, and liquids which may be present in the environment in which the tool is used.

These aspects of the invention can be combined depending on the circumstances, as will be seen hereinafter.

In the description, the terms "anterior", "front" or "distal" will also be used to denote the end of the tool normally furthest from the user, whereas the terms "posterior", "rear" and "proximal" are used to indicate the end of the tool closest to the user with normal use. The front end generally comprises the active elements of the tool, for example blades, whereas the rear end is equipped with a handle allowing the user to grasp the tool.

BRIEF DESCRIPTION OF THE FIGURES

Exemplary implementations of the invention are indicated in the description illustrated by the accompanying figures, in which:

FIGS. 3a and 3c illustrate, in two orthonormal views, an example of the tool of the invention in an extended configuration (blades closed).

FIGS. 3b and 3d illustrate in detail the connection between the connecting rod and the actuator of the tool of FIGS. 3a and 3c respectively.

In the following description provided by way of example, reference will be made, for reasons of simplicity, to a pruning shear. It should be understood, however, that the invention is not limited to such a tool, but includes all the tools covered by the claims. The invention also is not limited to agriculture, but also includes, for example, shears, pincers, or presses for industrial and medical applications and for applications in any other field.

EXEMPLARY EMBODIMENT(S) OF THE INVENTION

Figure 1:
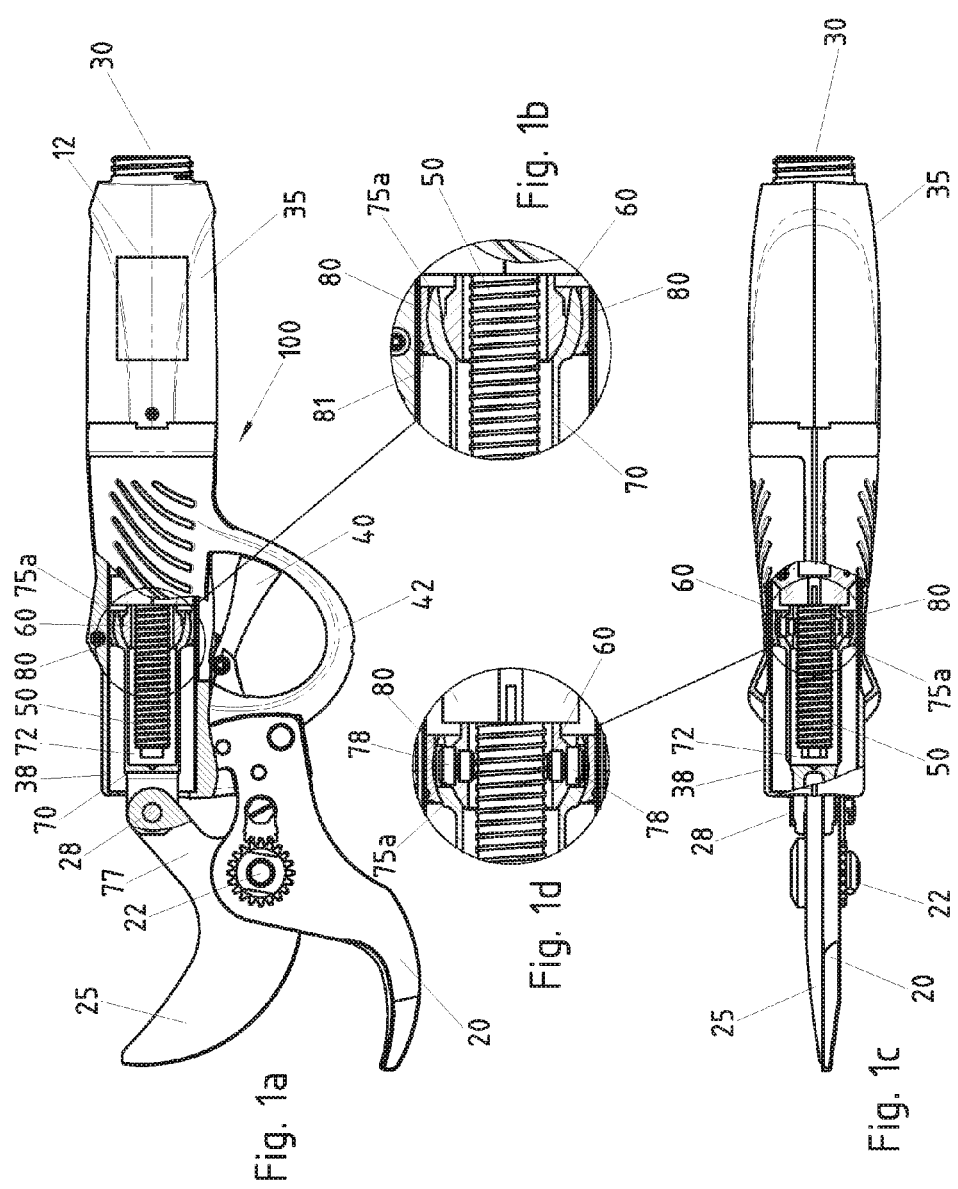
FIGS. 1a and 1c illustrate, in two orthonormal views, an example of the tool of the invention in a retracted configuration (blades open).
FIGS. 1b and 1d illustrate in detail the connection between the connecting rod and the actuator of the tool of FIGS. 1a and 1c respectively.

FIGS. 1a and 1c illustrate a pruning shear in accordance with one aspect of the invention with a sleeve 35, intended to be grasped by the user, connected to an electric power supply source by the connector 30 and a cord, not shown. The user can control the movement of the movable blade 25 relative to the counter blade 20 by acting on the trigger 40, which is protected by the guard 42. Typically, pulling on the trigger 40 will trigger the work stroke of the tool, in which the movable blade 25 moves in a first direction and, for example, closes against the counter blade 20 in order to cut a branch, whereas releasing the trigger 40 will provoke the return stroke, in which the movable blade 25 moves in the opposite direction and moves away from the counter blade 20. Typically, the force exerted during the cutting action is considerably greater than that required in the return stroke.

The action on the trigger 40 is transmitted to a control circuit, which actuates an electric motor in the sleeve 35, not visible in the figures. The motor acts, possibly by means of a gearing group, on an actuator 10, represented here by the screw 50 and the ball nut 68 forming a linear actuator, as can be seen in FIG. 2.

The linear actuator 10 transforms the rotation of the electric motor into an axial movement in translation of the ball nut 68. The ball nut comprises, at a distal end, a protrusion 60 with a spherical surface which exactly matches the inner spherical surface 75b of a hollow present on a proximal end of the connecting rod 70. The two spherical surfaces 60, 75b enable the transmission of the axial force generated by the actuator 10 to the connecting rod 70 and constitute a first linkage of the ball joint type.

Figure 2:
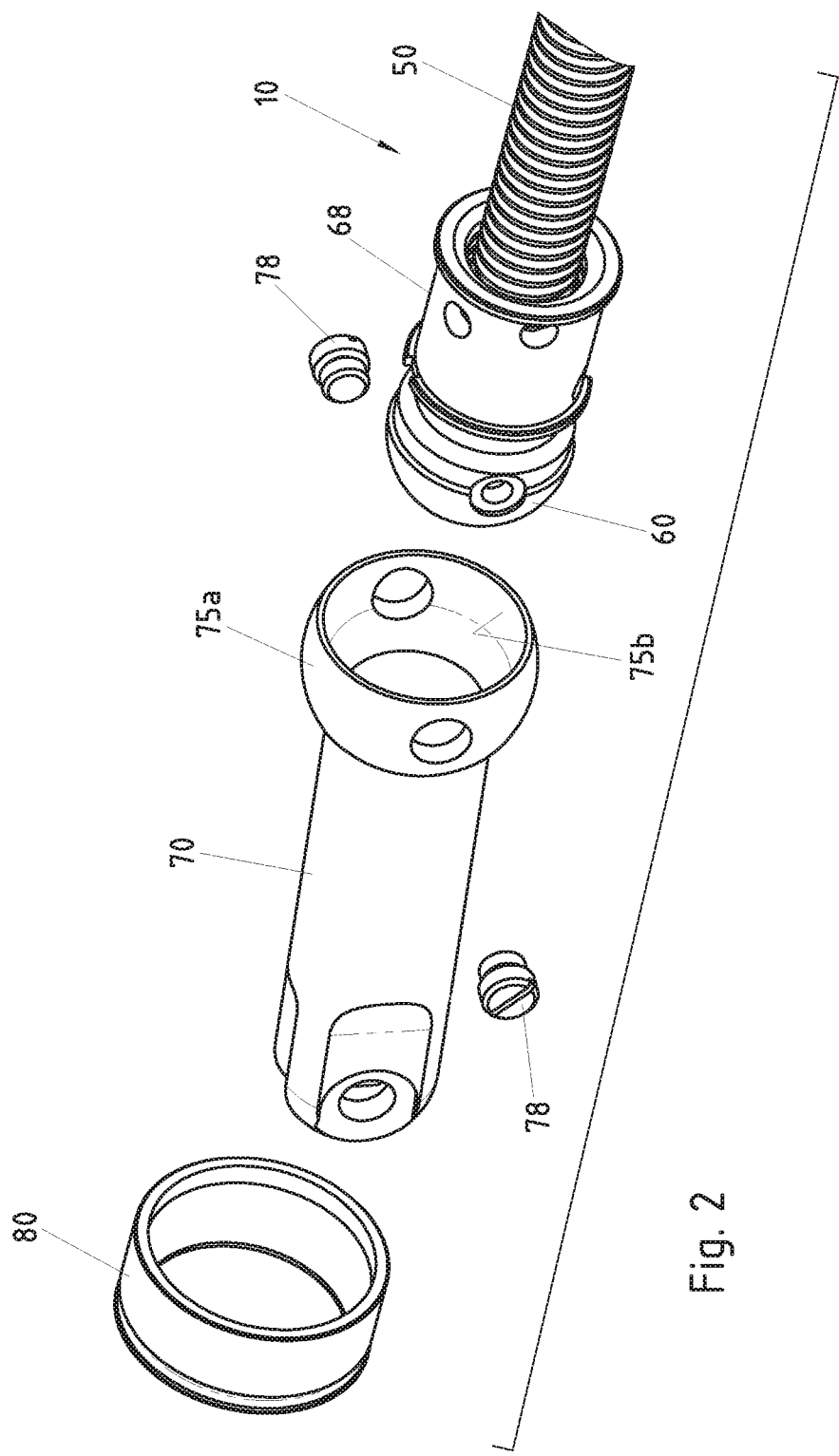
FIG. 2 illustrates part of the actuator of the invention.

The diameter of the opening of the inner spherical surface 75b is sufficient to allow the insertion of the protrusion 60, which is then held within the hollow via the two opposed screws 78, which can be seen in FIGS. 2, 1d and 3d. These screws also allow the transmission of a tractive force on the connecting rod 70, whereas the compressive force is transmitted via the spherical surfaces 60, 75b.

The hollow in the end of the connecting rod 70 also comprises a second spherical surface 75a, external, which is concentric with the spherical surface 75b. This spherical surface matches a complementary spherical surface of the guide ring 80, forming a second linkage therewith of the ball joint type, which is concentric with the first linkage.

The guide ring 80 slides linearly inside the cylindrical body 38 of the tool, as can be seen in FIGS. 1a, 1c, 3a and 3c. In this way, the proximal end of the connecting rod 70 and the common center of rotation of the first and of the second ball joint are always aligned with the common axis of the screw 50 and of the cylindrical body of the tool.

This double linkage of the ball joint type thus has the advantage of preventing any transmission of lateral force to the actuator. The radial forces are transmitted via the guide ring 80 to the body 38 of the tool. A 25 very compact loop of forces is thus obtained as well as excellent lateral rigidity. At the same time, the ball screw 50 and the nut 68 do not have to withstand any radial or bending force, whatever the position of the connecting rod 70, which increases the efficacy of transmission and the reliability of the assembly.

A further advantageous aspect of the invention is that the guide ring 80 prevents the passage of dusts, foreign bodies or drops of liquid from the front to the rear of the tool.

The tool body and the guide ring 80 thus delimit a protected volume that shelters the ball screw and the nut 68 forming the actuator 10, and preferably also the electric motor and any electronic unit present in the sleeve 35.

In accordance with an important aspect of the invention, the guide ring 80 is made of a high-performance polymer having the required mechanical characteristics, having a low coefficient of friction and preferably self-lubricating. Materials suitable for this application include, for example, Teflon® (PTFE), polyethylene (PE), polyethylene terephthalate (PET), polyethylene terephthalate polyester (PETP), polyamide, or Delrin® (POM). This list is not exhaustive. The guide ring 80 could, however, also be made of metal, for example brass. The guide ring 80 may be a part that is susceptible to wear and that is to be replaced as necessary and may have a lip 81, visible for example in FIG. 1b, on its anterior edge so as to clean the inner surface of the body of the tool of any dirt that could deposit there.

It can be appreciated, for example in FIGS. 1a-1c, that the connecting rod 70 comprises an axial cavity 72 and that the screw 50 enters inside this cavity 72 in part when the actuator is in the retracted position, which corresponds in this example to the position in which the blades are open. There is thus a longitudinal superimposition, at least in part, of the actuator and the connecting rod, since the actuator can enter the cavity in the connecting rod, at least in part, in the retracted position, which makes it possible to obtain shorter tools, which are thus lighter.

As can be seen in the figures, when the user controls the closing of the blades, the connecting rod 70 pushes the blade 25, via the articulation 28, toward the counter blade 20. It is during this work stroke of the tool that the cutting operations are performed and that the transmitted forces are greatest. During the return stroke, by contrast, the tractive force exerted by the connecting rod 70 is considerably less.

Thanks to the fact that the work stroke is transmitted by the connecting rod 70 by pushing the movable element 25, it is possible to simply connect the actuator and the movable element via the single connecting rod 70, without the need for combined lever systems, which requires a greater efficacy of action. During the work stroke, the axial and lateral forces are transmitted via the relatively broad spherical surfaces 60, 75b and 75a, 80, such that the pressure values remain limited, even in the presence of significant cutting forces.

By virtue of the compact arrangement of the mechanical elements of the invention, a relatively long connecting rod

70 can be used without excessively increasing the longitudinal bulk and thus maintaining a sufficient distance between the axis 22 of rotation of the blade 25 and the pivot 28. In this way, the angle between the connecting rod 70 and the lever 77, which can be seen in FIG. 1a, remains substantially close to its optimum value.

REFERENCE NUMBERS USED IN THE FIGURES

10 actuator
20 fixed element, counter blade
22 axis
25 movable element, movable blade
28 articulation
30 connector
35 sleeve
38 cylindrical body, slide
40 trigger
42 guard
50 screw
60 protrusion, sphere
68 nut
70 connecting rod
72 axial cavity
75 head of the connecting rod
75a outer spherical surface
75b inner spherical surface
77 lever
78 screw
80 scraper, guide element
81 lip
100 pruning shear
12 motor-gear reducer group

The invention claimed is:

1. A handheld electric tool comprising an actuator acting by means of a connecting rod on a movable element configured to perform, under the action of the actuator, a work stroke in a first direction and a return stroke in a second direction, opposite the first direction,
in which the actuator is used to provide a work force during the work stroke and a return force substantially smaller than the work force during the return stroke, and in which the work force is transmitted by pushing the movable element,
wherein
the connecting rod is connected to the actuator via a first ball joint linkage and to a guide element via a second ball joint linkage, which is concentric with said first ball joint linkage.

2. The handheld electric tool as in claim 1, wherein said guide element is a guide ring that slides inside a cylindrical body of the tool, such that the body of the tool and the guide ring delimit a protected volume within which the actuator is arranged.

3. The handheld electric tool as in claim 2, wherein said guide ring is made of a synthetic polymer.

4. The handheld electric tool as claimed in claim 2, wherein said guide ring comprises a lip for cleaning said body of the tool.

5. The handheld electric tool as claimed in claim 2, wherein said connecting rod is hollow and said protected volume also includes an interior of the connecting rod.

6. The handheld electric tool as claimed in claim 1, wherein said actuator is a linear electric actuator comprising a motor-gear reducer group acting on a ball screw, which drives a ball nut in translation.

7. The handheld electric tool as claimed in claim 1, wherein said actuator enters an axial cavity in said connecting rod, at least in part, during the movement of said movable element.

8. The handheld electric tool as claimed in claim 1, wherein said movable element is a blade or a knife moving relative to a counter blade.

9. The handheld electric tool as claimed in claim 1, forming a pruning shear or shear.

* * * * *